No. 677,048. Patented June 25, 1901.
H. F. WALLMANN.
INTERNAL COMBUSTION ENGINE.
(Application filed Apr. 20, 1900.)
(No Model.) 3 Sheets—Sheet 3.
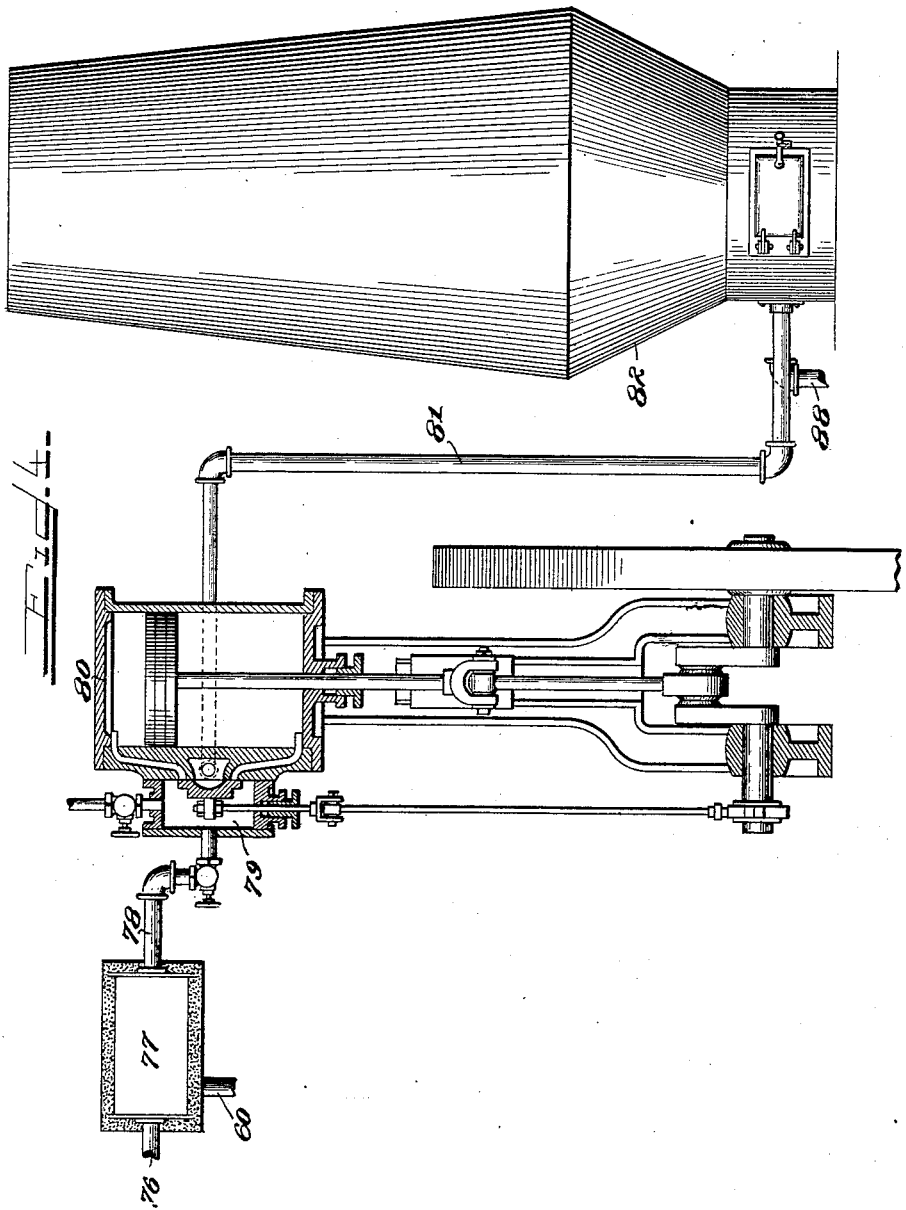

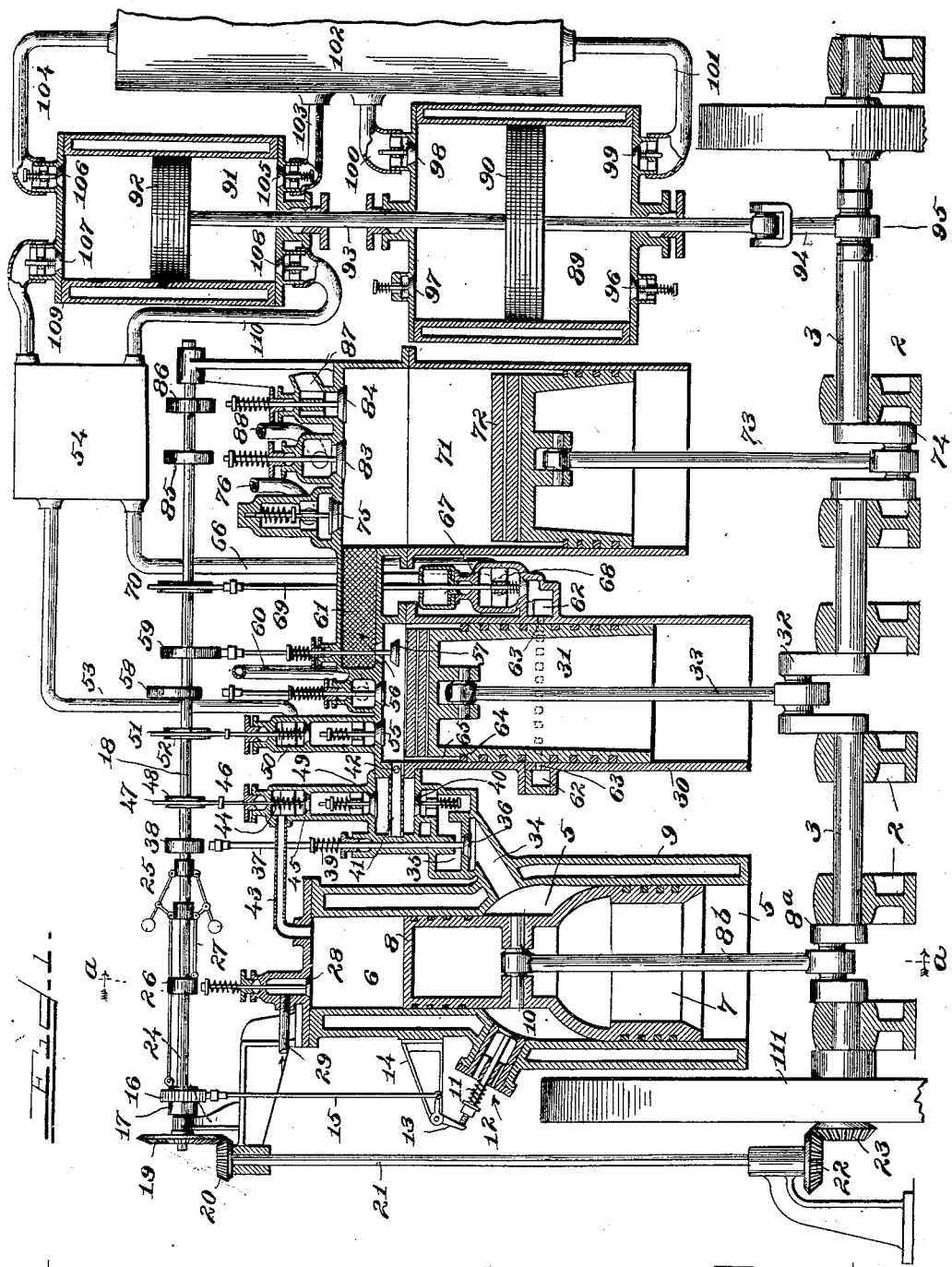

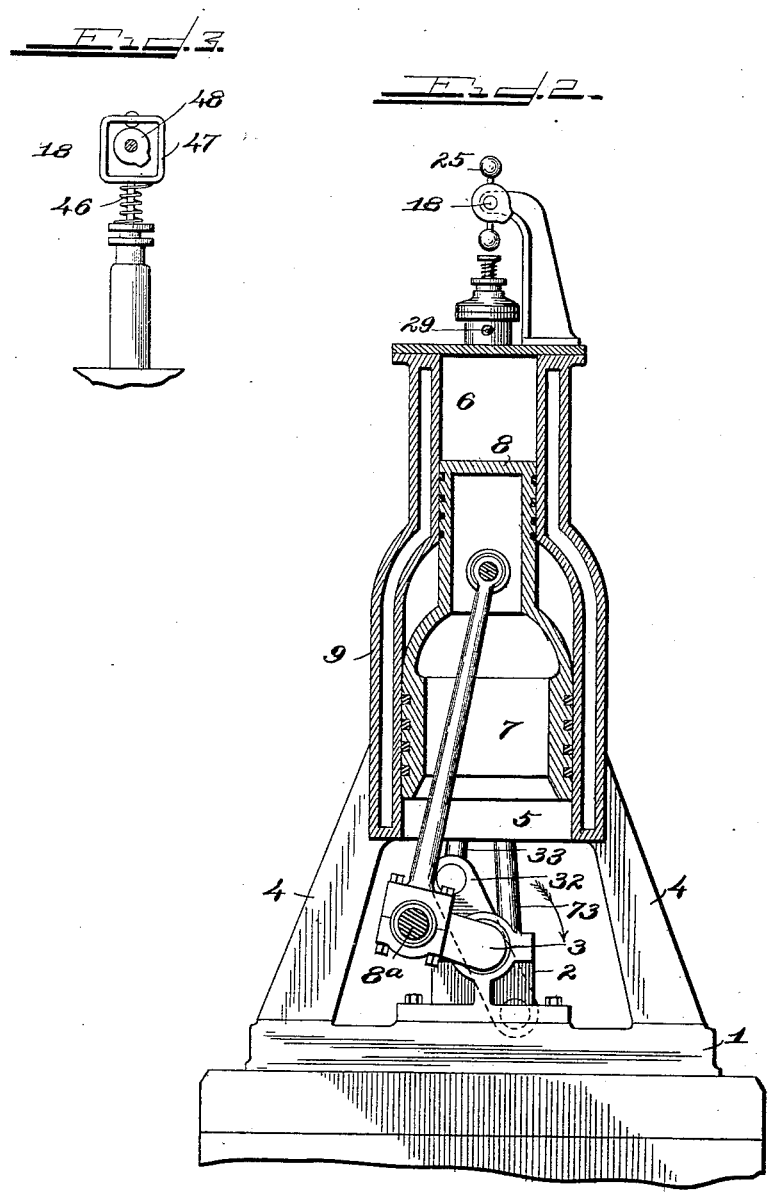

UNITED STATES PATENT OFFICE.

HENNING FRIEDRICH WALLMANN, OF CHICAGO, ILLINOIS.

INTERNAL-COMBUSTION ENGINE.

SPECIFICATION forming part of Letters Patent No. 677,048, dated June 25, 1901.

Application filed April 20, 1900. Serial No. 13,655. (No model.)

*To all whom it may concern:*

Be it known that I, HENNING FRIEDRICH WALLMANN, of Chicago, in the county of Cook and State of Illinois, have invented certain new and useful Improvements in Internal-Combustion Engines, of which the following is a description, reference being had to the accompanying drawings, forming a part of this specification, in which corresponding numerals of reference in the different figures indicate like parts.

My invention relates to internal-combustion engines; and my object is to so construct and organize such an engine, in combination with other apparatus, that the heat resulting from combustion may be utilized to heat compressed air, and thus convert by expansion a greater number of the units of heat into useful work, and, in addition, to utilize such heat as cannot be converted into work by exhausting the warm compressed air into a furnace or into another apparatus or device in which hot compressed air may be used to advantage.

To this end my invention consists in causing the products of combustion of a body of air and fuel, preferably in gaseous form under pressure, and a body of compressed air to alternately and separately expand against a piston for producing motive power, the compressed air absorbing and by expansion partly converting into power a portion of the heat previously imparted by the products of combustion to the cylinder-walls, and in providing separate exhaust-ports for the eduction of the expanded products of combustion and that of the expanded air, respectively, thereby rendering it practicable to separately exhaust both the products of combustion and the more or less expanded exhaust-air, which latter retains a certain amount of heat and may therefore be utilized to advantage for promoting combustion in furnaces or otherwise.

In order to facilitate the transference of heat from the products of combustion to the compressed air, I prefer to combine with the combustion-cylinder a low-pressure expansion-cylinder, interposing in the passage between the two a regenerator, consisting of wire-gauze or constructed in any well-known way, so that the highly-heated products of combustion in passing may impart heat to the regenerator, which heat is afterward absorbed by the compressed air following in the next cycle. In order to more effectually obtain said result, as well as to cool the cylinder-walls and maintain the compressed air in a pure condition, I employ a scavenging device, all of which is hereinafter more particularly described, and definitely pointed out in the claims.

In the drawings, Figure 1 is a central longitudinal vertical sectional view of an engine embodying the features of my invention in a form which I consider the best. Fig. 2 is a transverse vertical sectional view thereof, taken upon the line *a a*, Fig. 1. Fig. 3 is an enlarged detail view of one of the cams for operating the valve mechanism. Fig. 4 is a central vertical sectional view of a separate engine and furnace, said view being intended to indicate the manner in which air heated within the internal-combustion engine may be utilized.

Referring to the drawings, 1, Fig. 2, represents the bed of my improved engine, upon which are bolted the usual pillow-blocks 2, which are adapted to serve as bearings for a crank-shaft 3, Figs. 1 and 2.

I will first describe the construction of what I regard as the best adaptation of my invention. Rigidly sustained above the crank-shaft by means of supports 4 4 is a combined air and gas compressor consisting of the cylinders 5 and 6, in which are fitted the pistons 7 and 8, connected in the manner shown with a crank $8^a$ by means of a pitman $8^b$. A water-jacket 9 surrounds said cylinders for cooling the same. The cylinder 5 is provided with an induction-valve 10 for admitting air thereto, which valve is held normally closed by means of a spring 11. The stem 12 of the valve is in operative connection with a bell-crank lever 13, pivoted upon a bracket 14, attached to the cylinder. A rod 15 connects said lever with a stirrup 16, operated by means of a cam 17, which is splined upon a horizontal shaft 18 and revolves therewith, said shaft being supported in suitable bearings, as shown, upon the top of the engine for the purpose of automatically controlling the several valves hereinafter referred to. Said shaft is connected, by means of beveled gears 19 20, to a vertical shaft 21, which is in turn connected, by means of beveled gears 22 23, to the crank-shaft 3, as shown. Said gears are so proportioned that the speed of the shaft 18 is one-half that of the crank-shaft. The cam 17 is connected, by means of a rod 24, to a ball-governor 25, which may cause said cam to move longitudinally upon the shaft 18. A cam 26, connected with said governor by means of a rod 27, is splined to said shaft so, also, as to move longitudinally thereon, said cam being intended when in its normal position to open an induction-valve 28, the spring-controlled stem of which is in operative proximity to said cam. Communicating with the valve-chamber of the valve 28 is a pipe 29, which is connected in turn with a source of gas-supply. The air-cylinder 5 and the gas-cylinder 6 are so proportioned with respect to each other that the air and gas drawn therein, respectively, will when commingled form an explosive mixture. The mechanism described which controls the opening of the valves 10 and 28 is so adjusted with relation to the governor that the respective charges of air and gas compressed during a given stroke may be varied according to the speed of the engine.

Next to the air and gas compressor described is located a combustion-cylinder 30, having therein a piston 31, connected with a crank 32 upon the shaft 3 by means of a pitman 33. The cranks 32 and 8ª are set at an angle of forty-five degrees with respect to each other. Leading from the interior of the air-compression cylinder 5 is a conduit 34, which communicates with a valve-chamber 35, the parts to which are controlled by means of two valves, the former of which, 36, is arranged to open against the pressure of air in the conduit 34 and is provided with a valve-stem 37, extending upwardly into operative proximity to a cam 38 upon the shaft 18. Said valve is held normally closed by means of a spring 39. A spring-actuated check-valve 40 normally closes a passage leading from the chamber 35 to a mixing and ignition chamber 41, having any well-known form of electric igniter 42 therein. A pipe 43 serves to connect the gas-compression cylinder 6 with a valve-chamber 44, in which is seated a valve 45, arranged to open against the gas-pressure, said valve being held normally closed by means of a spring 46, the stem of said valve having a yoke 47 thereon, (shown in detail in Fig. 3,) which yoke is in engagement with a cam 48, adjusted to open said valve at the proper time—viz., every other cycle simultaneously with the opening of the valve 36—for the admission of compressed air to the mixing-chamber. A check-valve 49 is interposed between the valve 45 and the mixing-chamber, which latter, as shown, is in communication with the interior of the combustion-cylinder 30.

The head of the combustion-cylinder 30 is provided with a valve-casing having an upwardly-opening valve 50 therein, the stem of which is connected, by means of a yoke 51, like the yoke 47, to a cam 52. Communicating with the chamber above the valve 50 is a pipe 53, which connects in turn with a compressed-air reservoir 54. An inwardly-opening spring-controlled check-valve 55 is seated in the head of the combustion-cylinder 30, which is opened by the pressure of the air from the pipe 53 when the valve 50 is opened. 56 and 57 are spring-controlled eduction-valves seated in the head of the combustion-cylinder, the stems of which respectively are in operative proximity to cams 58 59, adapted to properly time the opening of the valves. The valve-chamber of the valve 56 communicates with a pipe 60, the purpose of which is hereinafter set forth. The valve 57 is intended to control communication between the combustion-cylinder and a low-pressure expansion-cylinder 71. A regenerator 61, made from wire-gauze or other suitable substance, is interposed in the passage between the two.

Surrounding the shell of the combustion-cylinder, as shown, is a hollow casing forming an annular canal 62, which is in communication with the cylinder by means of a series of ports 63, which are closed at all times except when the piston is sufficiently near the end of its outward stroke to permit the last ring 64 of said piston to pass below said ports, the upper portion of said piston being smaller than the diameter of the cylinder, so as to leave a space 65 between them for the purpose hereinafter stated. The canal 62 is connected with the reservoir 54 by means of a pipe 66, which connects with a valve-casing 67, in which is located a valve 68, having its stem 69 connected by means of a yoke with a cam 70, by which the valve may be opened against the pressure of air from the pipe 66.

The low-pressure expansion-cylinder 71 is provided with a piston 72, connected, by means of a pitman 73, with a crank 74, which is set at an angle of one hundred and eighty degrees from the crank 32.

In the head of the expansion-cylinder 71 is located a spring-controlled check-valve 75, the port of which is in communication with a pipe 76, which may be connected with a receiver 77, (shown in Fig. 4,) which receiver may in turn be connected, by means of a service-pipe 78, with the usual valve-chamber or "steam-chest" 79 of an ordinary reciprocating engine 80, the exhaust from which may be conveyed, by means of a pipe 81, to a blast or other furnace 82. Normally-closed spring-controlled valves 83 84, arranged to open inwardly, are also located in said expansion-cylinder head, the stems of said valves respectively being in operative proximity to cams 85 86 upon the shaft 18.

The valve 84 is the final exhaust-valve for the products of combustion and communicates with a pipe 87, which may be conducted into the open air or to a chimney, as may be desired. The valve 83, which alternates in its action with the valve 84, communicates with a pipe 88, Figs. 1 and 4, which also leads to the furnace 82.

It is obvious that the reservoir 54 may receive its compressed air from an air-compressor driven from any source of power, and upon this assumption I may be said to have completed the description of the several parts of my improved engine; but as I desire to render the same self-contained I prefer to connect an air-compressor directly with the main crank-shaft. To this end I provide a low-pressure air-compression cylinder 89, having a piston 90, and a high-pressure air-compression cylinder 91, having a piston 92, said pistons being mounted upon a common piston-rod 93, connected, by means of a pitman or connecting-rod 94, to a crank 95. The piston 90 alternately sucks in atmospheric air through the valves 96 97 and forces it out through the valves 98 99 through pipes 100 and 101 to a low-pressure receiver 102, from whence it is alternately sucked through the pipes 103 104 and valves 105 106 to the cylinder 91, and thence through the valves 107 108 and pipes 109 110 to the high-pressure receiver 54.

The operation of my improved device is as follows: The crank-shaft being rotated, for example, by means of the fly-wheel 111, atmospheric air is drawn through the valve 10 and gas through the valve 28 upon the outward stroke of the pistons 7 8. During the inward stroke of the pistons after the closing of said inlet-valves the air and gas are compressed until the crank 8ª is nearly forty-five degrees from its inner dead-center, at which time the crank 32 will have arrived at a position nearly to its dead-center. The cam 59 is so timed as to cause the valve 57 to close just before said cranks reach said respective positions. Immediately after the closing of the valve 57 the valves 36 and 45 are opened simultaneously through the action of the cams 38 48. The pressure of air and gas causes the opening of the check-valves 40 49, thereby admitting the compressed air and gas through the mixer 41 into the combustion-cylinder 30. When the pistons driven by the crank 8ª have nearly completed their inward stroke and the crank 32 has moved nearly forty-five degrees outwardly from its inner dead-center, the charge of air and gas is ignited by means of the igniter 42, and the explosion serves to drive the piston 31 outwardly. The pressure rapidly decreases until it falls below that existing in the high-pressure receiver 54. At the instant the last piston-ring 64 has moved downwardly past the parts 63 a jet of compressed air from said receiver is blown into the annular space 65 between the piston and cylinder, the cam 70 being timed to open the valve 68 for that purpose and to leave said valve open for a longer or shorter period, according to the duty required of the engine. The cam 59 is so timed that when the crank 32 reaches a position nearly at its outer dead-center it causes the valve 57 to open. The products of combustion are then admitted to the regenerator 61, through which they pass in a highly-heated state and emerge into the expansion-cylinder 71, leaving the regenerator heated to a high degree. At this time the crank 74, connected with the expansion-piston, is in the act of passing its inner dead-center and immediately afterward begins its outward stroke. Just before the latter is finished the valve 57 is closed. At this time the products of combustion will have expanded nearly to or below atmospheric pressure. At the proper time following this action the exhaust-valve 84 is caused to open by the action of the cam 86, and the products of combustion are expelled by the inward stroke of the piston 72, thereby completing the first cycle. It is obvious that during the cycle described the products of combustion exercise a certain pressure against the valve 75, especially immediately after the opening of the valve 57; but the products of combustion having before expanded within the combustion-cylinder to a pressure below that of the air in the receiver 54 the pressure of said products of combustion after their admission to the low-pressure expansion-cylinder would not be sufficient to open the valve 75 against the pressure existing in the receiver 77, Fig. 4. During the outward stroke of the expansion-piston and the inward stroke of the piston 31 the double compression-piston 7 8 follows with cranks 32 and 8ª at an angle of forty-five degrees to each other. The valve 28 is kept open by the cam 26, so that the gas sucked in during the outstroke of the piston can return to its source and no gas can be compressed for the second cycle; but the air which is compressed by the part 7 of said double piston may be used for scavenging the combustion-cylinder before the piston of the latter completes its inward stroke. For this purpose the valve 36 is opened at the proper time by the cam 38. The valve 57 is closed before the combustion-piston finishes its inward stroke and immediately thereafter the valve 50 is opened by means of its cam 52 for admitting compressed air through the check-valve 55 into the combustion-cylinder during a certain period of the outward stroke of the piston therein, and an additional volume of compressed air may be admitted therein through the ports 63, as described, when the piston-ring 64 shall have passed said ports.

The valve 56 is not essential to the action of the engine and need only be employed in the event that it should be desired to drive another engine, in which case a part of the compressed air introduced into and heated within the combustion-cylinder may be discharged through said valve 56 and delivered to the receiver 77, Fig. 4, for driving and independent engine. Said valve would ordinarily be closed before the completion of the outward stroke of the piston 31, at which time the valve 57 would be opened for admitting compressed air to the expansion-cylinder. The compressed air while passing through the regenerator absorbs heat therefrom and may, if desired, be partly discharged through the valve 75 and pipe 76 into the receiver 77 for use in driving an independent engine; but this valve, like the valve 56, may be dispensed with unless it should be desirable to use it for such purpose. The remainder of the compressed air admitted to the expansion-cylinder expands until the piston 72 completes its outward stroke, at which time the valve 83 is caused to open to permit the warm air to flow into the furnace through the pipe 88, thereby completing the second cycle.

The annular canal 62, ports 63, valve 68, and pipe 66 are not necessary to my improved construction, although I prefer to use them; nor is the first-described compressor necessary, as it is obvious, as stated, that air and gas may be taken from any convenient source.

The action of the governor is such that in case the speed is excessive a certain amount of air and gas may be forced back through the valves 10 and 28 by the inward stroke of the compression-piston, thereby avoiding the use of an excessive amount of explosive material and regulating the speed of the engine.

My device is especially advantageous and is designed for use in iron and steel industries where it is not only necessary to utilize large quantities of compressed air, but to provide means for heating it. The waste incident to the usual methods employed in such plants is very great; but by using separate exhaust-valves, as described—one for the products of combustion and the other for pure heated air—the heat units lost in the ordinary process are saved by the use of my apparatus.

Having thus described my invention, I claim—

1. In an engine of the class described, the combination of a combustion-cylinder, a crank-shaft, a piston in operative connection with said cylinder and crank-shaft, a source of compressed air, a source of carbonaceous fluid, means for alternately admitting explosive charges of carbonaceous fluid and air, and charges of compressed air to the combustion-cylinder on the same side of the piston, means for igniting said explosive charges, separate exhaust-ports for the charges of different character, and a conduit leading from one of said exhaust-ports to an apparatus for utilizing one of said charges, substantially as described.

2. In an engine of the class described, the combination of a combustion-cylinder, a low-expansion cylinder, a crank-shaft, pistons in operative connection with said cylinders and crank-shaft respectively, a source of compressed air, a source of carbonaceous fluid, means for alternately admitting explosive charges of carbonaceous fluid and air and charges of compressed air to one and the other of said cylinders respectively, separate exhaust-ports in said expansion-cylinder for said alternate charges, and an eduction-pipe leading from one of said exhaust-ports to an apparatus for utilizing one of said charges, substantially as described.

3. In an engine of the class described, the combination of a combustion-cylinder, a low-expansion cylinder, a crank-shaft, a piston in operative connection with said cylinder and crank-shaft, a source of compressed air, a source of carbonaceous fluid, means for alternately admitting explosive charges of carbonaceous fluid and air and charges of compressed air to one and the other of said cylinders successively, separate exhaust-valves in said expansion-cylinder for said alternate charges, an eduction-pipe leading from the exhaust-port for said compressed-air charge, a separate engine in operative connection with said eduction-pipe, and a furnace in operative connection with the exhaust-pipe from said separate engine, substantially as described.

4. In an engine of the class described, the combination of a combustion-cylinder, a crank-shaft, a piston in operative connection with said cylinder and crank-shaft, a source of compressed air, a source of fuel, means for admitting explosive charges of air and carbonaceous fluid and charges of compressed air to the combustion-cylinder substantially as hereinbefore set forth, means for igniting said explosive charges, an expansion-cylinder in communication with said combustion-cylinder, a regenerator in open communication with the expansion-cylinder, separate exhaust-valves for said respective charges, means for actuating said exhaust-valves to conform to the order of admission of the compressed-air charges, and a receiver in operative connection with said exhaust-valve for the eduction of compressed air.

5. In an engine of the class described, the combination of a combustion-cylinder, a crank-shaft, a piston in operative connection with said cylinder and crank-shaft, a source of fuel, an air-compressor and means for causing the latter to deliver during alternate revolutions of said crank-shaft, charges for the promotion of combustion and for scavenging the combustion-cylinder respectively, substantially as described.

6. The combination of a combustion-cylinder, a crank-shaft, a source of fuel, an air-compressor, means for delivering to the combustion-cylinder alternate combustible and non-combustible charges, means for mixing the combustible charges with compressed air during their expansion within the combustion-cylinder, separate exhaust-ports for said respective charges, and a conduit leading from one of said exhaust-ports to an apparatus for utilizing one of said charges while in a heated state, substantially as described.

7. The combination of a combustion-cylinder, a crank-shaft, a piston in operative connection with said cylinder and crank-shaft, a source of compressed air, a source of fuel, means for admitting explosive charges of air and carbonaceous fluid and charges of compressed air to the combustion-cylinder in an order with respect to each other substantially as described, means for igniting said explosive charges, and means for absorbing heat from the products of combustion after they have left the combustion - cylinder and for transferring said heat into the charge of compressed air after the exit of the latter from the combustion-cylinder.

8. The combination of a combustion-cylinder, a crank-shaft, a piston in operative connection with said cylinder and crank-shaft, a source of compressed air, a source of fuel, means for admitting explosive charges of air and carbonaceous fluid and charges of compressed air to the combustion-cylinder in a predetermined ratio with respect to each other, means for igniting said explosive charges, means for scavenging said cylinder after each explosion, and means for absorbing heat from the products of combustion after they have left the combustion-cylinder and for transferring said heat into the charge of compressed air after the exit of the latter from the combustion-cylinder, substantially as described.

9. In an engine of the class described, the combination of a combustion-cylinder, a low-expansion cylinder, a crank-shaft, pistons in operative connection with said respective cylinders and crank-shaft, a source of compressed air, a source of carbonaceous fluid, means for admitting combustible and non-combustible charges to the combustion-cylinder in the order set forth, means for igniting said combustible charges, an eduction-valve for each of said cylinders, and an eduction-pipe leading from the eduction-valve in the combustion-cylinder to an apparatus for the utilization of said heated fluid.

10. In an engine of the class described, the combination of a combustion-cylinder, a low-expansion cylinder, a crank-shaft, pistons in operative connection with said cylinders and crank-shafts respectively, a source of compressed air, a source of carbonaceous fluid, means for alternately admitting explosive charges of carbonaceous fluid and air and charges of compressed air to the combustion-cylinder, separate exhaust-ports in said expansion-cylinder for said alternate charges, and an eduction-pipe leading from the exhaust-port for said compressed-air charge to an apparatus adapted to utilize the heated air, substantially as described.

11. In an engine of the class described, the combination of a combustion-cylinder, an air-compressor, a crank-shaft, pistons in operative connection with said combustion-cylinder crank-shaft and air-compressor respectively, means for delivering air from said compressor to said combustion-cylinder on the same side of the piston thereof with each successive cycle of said engine, a source of carbonaceous fluid, and means for delivering charges thereof during predetermined cycles only on the same side of the piston and withholding the same during intermediate cycles, substantially as described.

12. In an engine of the class described, the combination of a combustion - cylinder, a crank-shaft, a piston in operative connection with said cylinder and crank-shaft, a fuel-pump, separate sources of compressed air at different relative pressures with respect to each other, means for admitting the compressed air at a lower pressure to the combustion-cylinder on the same side of the piston thereof during given cycles, means for admitting the compressed air at a higher pressure during other cycles, and means for utilizing the latter in a heated state, substantially as described.

13. In an engine of the class described, the combination of a combustion - cylinder, a crank-shaft, a piston in operative connection with said cylinder and crank-shaft, a source of fuel, separate sources of compressed air at different relative pressures with respect to each other, means for alternately admitting compressed air to the combustion-cylinder on the same side of the piston thereof from one and then the other of said sources, and means for utilizing for power purposes said high-pressure charges when expanding, substantially as described.

14. In an engine of the class described, the combination of a combustion - cylinder, a crank-shaft, a piston in operative connection with said cylinder and crank-shaft, a source of fuel, a source of compressed air, means for admitting combustible charges to said combustion-cylinder on the same side of the piston thereof during alternate revolutions of said crank-shaft, means for mixing the products of combustion with compressed air during their expansion, and means for admitting non-combustible charges to said combustion-cylinder on the same side of the piston thereof during alternate revolutions of said crank-shaft, substantially as described.

In testimony whereof I have signed this specification, in the presence of two subscribing witnesses, this 18th day of April, 1900.

HENNING FRIEDRICH WALLMANN.

Witnesses:
D. H. FLETCHER,
DWIGHT B. CHEEVER.